[11] 3,929,980

Abraham et al.

[45] Dec. 30, 1975

[54] METHOD OF PRODUCING HYDROGEN

[75] Inventors: Bernard M. Abraham, Oak Park; Felix Schreiner, Mokena, both of Ill.

[73] Assignee: The United States of America as represented by the United States Energy Research and Development Administration, Washington, D.C.

[22] Filed: Dec. 26, 1974

[21] Appl. No.: 536,694

[52] U.S. Cl. ............... 423/648; 423/393; 423/396; 423/397; 423/470; 423/499; 423/500; 423/579
[51] Int. Cl.[2] .............................................. C01B 1/02
[58] Field of Search ........... 423/648, 396, 393, 470, 423/397, 579, 500, 499

[56] References Cited
UNITED STATES PATENTS

| | | | |
|---|---|---|---|
| 910,530 | 1/1909 | Halvorsen | 423/393 |
| 1,330,136 | 2/1920 | Partington et al. | 423/396 |
| 1,955,031 | 4/1934 | Steudemann | 423/397 |
| 2,109,347 | 2/1938 | Beekhuis, Jr. | 423/396 |

OTHER PUBLICATIONS

Scientific American, Jan. 1973, Vol. 228, No. 1, pp. 13–21.
Symposium on Non-Fossil Chemical Fuels, article by DeBeni et al., Apr. 10–14, 1972, pp. 110–133.

*Primary Examiner*—Edward Stern
*Attorney, Agent, or Firm*—Dean E. Carlson; Arthur A. Churm; Frank H. Jackson

[57] ABSTRACT

Water is thermochemically decomposed to produce hydrogen by the following sequence of reactions. $KNO_3$ and $I_2$ are reacted to produce KI, NO and $O_2$, the NO and $O_2$ thus produced are reacted with water to form $HNO_3$, a hydrogen-containing iodide — $NH_4I$ or HI — is formed from the $HNO_3$, and this iodide is thermally decomposed to produce hydrogen, all products of the reactions being recycled except hydrogen and oxygen.

2 Claims, No Drawings

METHOD OF PRODUCING HYDROGEN

CONTRACTUAL ORIGIN OF THE INVENTION

The invention described contract was made in the course of, or under, a contact with the UNITED STATES ATOMIC ENERGY COMMISSION.

BACKGROUND OF THE INVENTION

This invention relates to a method of producing hydrogen. In more detail, the invention relates to the thermochemical decomposition of water to produce hydrogen.

An assured long-term supply of inexpensive energy is essential for maintenance and growth of a modern industrial society. It has been suggested — see, for example, pages 13–21 of Scientific American for January 1973 — that hydrogen is an excellent choice as a general fuel or energy carrier because it is nonpolluting and can be produced from energy sources other than fossil fuel. Hydrogen can be burned to develop thermal energy or used in a fuel cell to develop electrical energy. However, if hydrogen is to become the fuel of the future, new procedures for producing it economically in large quantities will have to be developed.

Presently hydrogen is produced by cracking natural hydrocarbons, by reacting coal with water or by the electrolysis of water. It is only by decomposing water using energy obtained from a nonfossil-fueled source such as nuclear or solar energy that depletion of fossil fuel reserves can be avoided.

To electrolyze water, primary energy in the form of heat — nuclear, geothermal or solar — or hydrostatic head must be converted into electricity. Such processes are inherently inefficient and, in addition, a large capital investment is required which affects the cost of the final product. Apart from cost there is the problem of the availability of electrical power. If it were desired to replace the thermal equivalent of all the fossil fuel currently consumed in the United States by electrolytic hydrogen, then the electrical generating capacity would have to be increased at least fifteenfold and, if only nuclear powered capacity is admitted, at least 150 fold. Clearly, an alternate to processes currently in commercial use must be developed if hydrogen is indeed to become the energy carrier of the future.

A thermochemical process not requiring conversion of primary heat into electricity would be ideally suited for the purpose provided the temperature of operation were sufficiently low that available sources of heat could be used. It has been shown that a single-stage thermochemical process for the production of hydrogen is not possible below 2227°K. Several processes consisting of more than one step have, however, been suggested. See De Beni and Marchetti, Proceedings of the Symposium on Non-Fossil Chemical Fuels at Boston, Mass., Apr. 10–14, 1972, pages 110–133. All of the suggested processes require temperatures higher than those available from presently operating nuclear reactors and geothermal sources.

SUMMARY OF THE INVENTION

According to the present invention, a series of steps is carried out having as net effect the thermochemical decomposition of water into its constituent elements. $KNO_3$ and $I_2$ are reacted to produce $KI$, $NO_2$ and $O_2$ and the $NO_2$ and $O_2$ are reacted to produce $HNO_3$. According to one embodiment of the invention, the $HNO_3$ thus produced is reacted with $NH_3$ to produce $NH_4NO_3$ which is reacted with the $KI$ produced in the first step to produce $NH_4I$ which is thermally decomposed into $NH_3$, $I_2$ and $H_2$. According to a second embodiment of the invention, the $HNO_3$ produced as above is put through a cation exchange resin in the potassium form, producing $KNO_3$ and leaving the resin in the hydrogen form. The $KI$ produced as above is put through the cation resin in the hydrogen form, regenerating the $K^+$-resin and producing $HI$ which is thermally decomposed to produce hydrogen. All reactions are carried out at atmospheric pressure. The net effect of each sequence is the decomposition of water into hydrogen and oxygen since all other products of the series of reactions are recycled.

DETAILED DESCRIPTION OF THE INVENTION

It will be observed that the present invention relates to a sequence of reactions wherein a hydrogen-containing iodide is thermally decomposed to produce hydrogen. According to one embodiment of the invention, this hydrogen-containing iodide is $HI$ and according to the other it is $NH_4I$. According to both embodiments of the invention, $KI$ and $HNO_3$ are produced from $KNO_3$, $I_2$ and water by the reactions (1)  $2 KNO_3$ (molten) + $I_2$ (crystalline) ⟶ $2 KI$ (crystalline) + $2 NO$ (gas) + $2 O_2$ (gas)

(2)  $2 NO$ (gas) + $3/2 O_2$ (gas) + $H_2O$ (liquid) ⟶ $2 HNO_3$ (aqueous)

Reaction (1) has been tried over the temperature range 626°–734°C. in sealed quartz containers. The reaction was found to have a very steep temperature coefficient with 8.9 percent of the iodine reacting at the lower temperature and 42 percent at the higher. The oxygen yield at the higher temperature was 75 percent of theoretical. Attempts to determine the equilibria have so far been unsuccessful. Based on these tests and other considerations, the recommended temperature of operation for this reaction is 730°C. and an acceptable range is 690°–780°C. Reaction (2) is a commercial process, so has not been investigated. Recommended temperature of operation is ambient with a range of 0°–100°C. being operative.

According to one embodiment of the invention, the following sequence of steps is followed subsequent to those given above.

(3.1)  $HNO_3$ (aqueous) + $K^+$ (cation resin) ⟶ $KNO_3$ + $H^+$ (cation resin)

(4.1)  $H^+$ (cation resin) + $KI$ (aqueous) ⟶ $HI$ (aqueous) + $K^+$ (cation resin)

(5.1)  $2 HI$ (gas) $\xrightarrow{heat}$ $H_2 + I_2$

Reactions (3.1) and (4.1) yield close to 80 of 100 percent pure product at ambient temperature and reaction (5.1) has yielded 44% $H_2$ on repeated passes through a decomposition zone at 700°C. Recommended temperature is 700°C. within a temperature range of ±50°C.

According to another embodiment of the invention, the following sequence of steps is followed subsequent to steps (1) and (2) above.

(3.2)  $2 HNO_3$ (aqueous) + $2 NH_3$ (gas) ⟶ $2 NH_4NO_3$ (aqueous)

(4.2) 2 KI (aqueous) + 2 $NH_4NO_3$ (aqueous) $\longrightarrow$ 2 $KNO_3$ (ppt.) + 2 $NH_4I$ (aqueous)

(5.2) 2 $NH_4I$ (gas) $\xrightarrow{heat}$ $H_2$ (gas) + $I_2$ (gas)

Reaction (3.2) is a commercial process and this was not investigated. Reaction (4.2) has yielded 95 of 100 percent pure $KNO_3$ at ambient temperature, the yield of $NH_4I$ has not yet been determined and reaction (5.2) has yielded 44% $H_2$ on repeated passes at 600°C. through a decomposition zone. Recommended temperature of decomposition is 700°C. within a range of ±50°.

It has thus been proven that both sequences produce $H_2$ and $O_2$ in reasonable yield. It will be appreciated that the recommended conditions of operation given above are those presently believed to yield the best results. However, optimum conditions of operation have not yet been established. In addition, to attain reasonable yields in the over-all process it will be necessary to recycle unreacted materials in some of the stages of the process and to employ repeated passes in others. Such techniques are conventional in the art.

The embodiments of the invention in which an exclusive property or privelege is claimed are defined as follows:

1. A method for decomposing water chemically comprising reacting molten $KNO_3$ and vaporous $I_2$ to form NO, $O_2$ and crystalline KI, reacting the NO and one half of the $O_2$ thus formed with water to form $HNO_3$, forming $NH_4I$ by reacting this $HNO_3$ with $NH_3$ to form $NH_4NO_3$ and reacting this $NH_4NO_3$ with the KI produced in the first step above recited, decomposing the $NH_4I$ to obtain hydrogen, and recycling all compound produced in this series of reactions except hydrogen and onehalf of the oxygen produced in the first-recited step, the net effect of the total process thus comprising the decomposition of water.

2. A method for decomposing water chemically according to claim 1 wherein the series of reactions employed follows:

$2 KNO_3 + I_2 \rightarrow 2 KI + 2 NO + 2 O_2$
$2 NO + 3/2 O_2 + H_2O \rightarrow 2 HNO_3$
$2 HNO_3 + 2 NH_3 \rightarrow 2 NH_4NO_3$
$2 KI + 2 NH_4NO_3 \rightarrow 2 KNO_3 + 2 NH_4I$
$2 NH_4I \xrightarrow{\Delta} 2 NH_3 + I_2 + H_2$.

* * * * *

UNITED STATES PATENT OFFICE
CERTIFICATE OF CORRECTION

Patent No. 3,929,980      Dated December 30, 1975

Inventor(s) Bernard M. Abraham and Felix Schreiner

It is certified that error appears in the above-identified patent and that said Letters Patent are hereby corrected as shown below:

Column 1, line 5, delete "contract" and insert --herein--.

line 6, delete "contact" and insert --contract--.

Signed and Sealed this

Sixth Day of July 1976

[SEAL]

Attest:

RUTH C. MASON  
*Attesting Officer*

C. MARSHALL DANN  
*Commissioner of Patents and Trademarks*